United States Patent [19]

Nakamura et al.

[11] Patent Number: 4,563,737
[45] Date of Patent: Jan. 7, 1986

[54] VIRTUAL STORAGE MANAGEMENT

[75] Inventors: Tomoaki Nakamura, Hitachi; Keiichi Nakane, Kokubunji; Hiroaki Nakanishi, Hitachi; Koji Hirai, Katsuta, all of Japan

[73] Assignee: Hitachi, Ltd., Tokyo, Japan

[21] Appl. No.: 448,274

[22] Filed: Dec. 9, 1982

[30] Foreign Application Priority Data

Dec. 11, 1981 [JP] Japan ................ 56-200645

[51] Int. Cl.⁴ .................... G06F 13/00; G06F 9/00
[52] U.S. Cl. .................................... 364/200
[58] Field of Search ... 364/200 MS File, 900 MS File

[56] References Cited

U.S. PATENT DOCUMENTS

| | | | |
|---|---|---|---|
| 3,825,904 | 7/1974 | Burk et al. | 364/200 |
| 3,902,164 | 8/1975 | Kelley et al. | 364/200 |
| 3,964,028 | 6/1976 | Belady et al. | 364/200 |
| 4,037,215 | 7/1977 | Birney et al. | 364/200 |
| 4,084,225 | 4/1978 | Anderson et al. | 364/200 |
| 4,096,568 | 6/1978 | Bennett et al. | 364/200 |

OTHER PUBLICATIONS

S. E. Madnick & J. J. Donovan: Operating Systems, McGraw-Hill Book Co., 1974, pp. 139–165.

Primary Examiner—James D. Thomas
Assistant Examiner—William G. Niessen
Attorney, Agent, or Firm—Antonelli, Terry & Wands

[57] ABSTRACT

A virtual storage managing system in which the storage address is managed by means of a virtual address, and the virtual storage area which can be assigned by the virtual address is divided into an address non-translation area which does not require the address translation and an address translation system which requires an address translation. The address translation area is divided into an address fixed area and an address variable area. In the address translation area, the correspondence between the virtual address and the real address is fixed in a 1:1 fashion, whereas, in the address variable area, the correspondence is determined at the time of starting of execution of a program and is dismissed when the execution of the program is completed.

5 Claims, 13 Drawing Figures

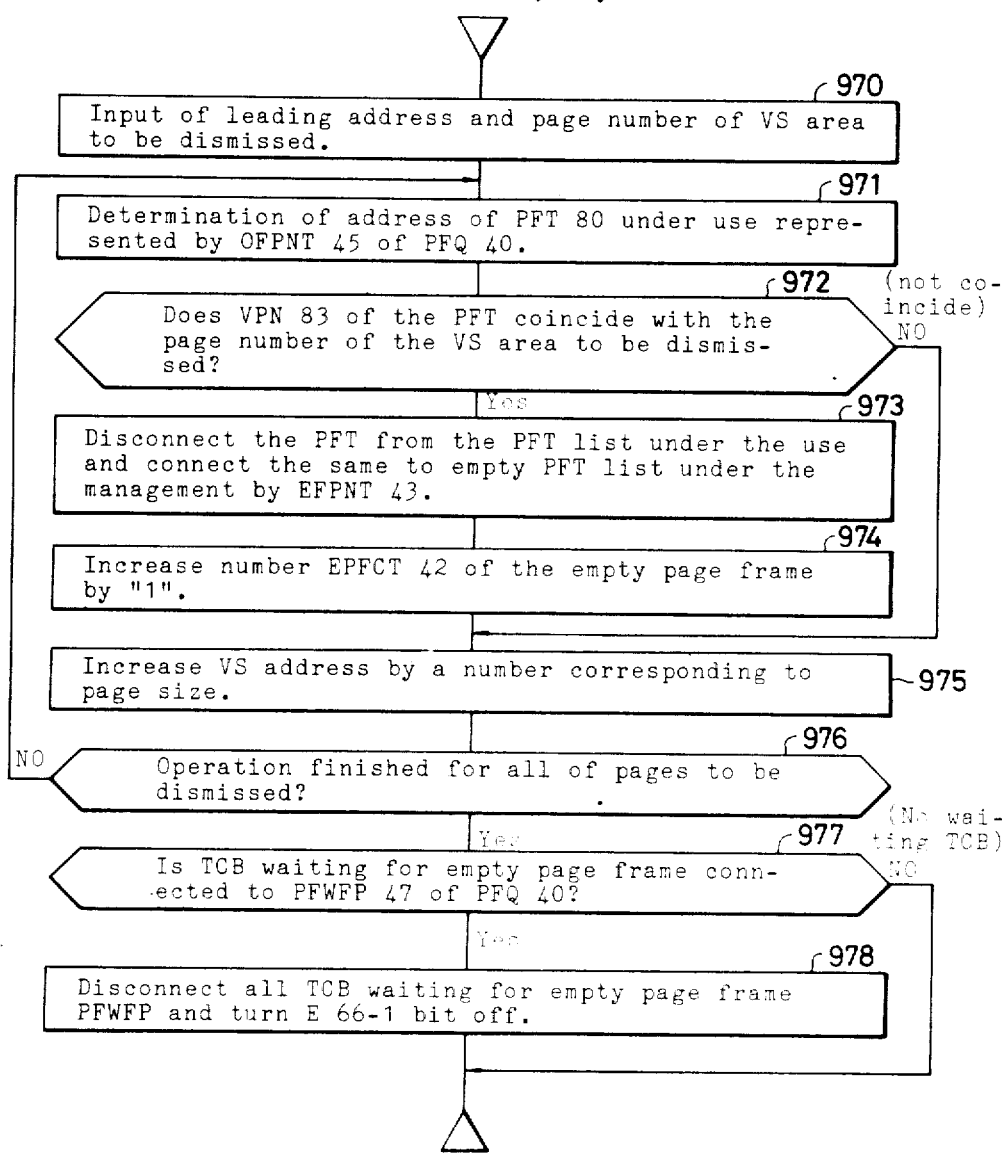

VIRTUAL STORAGE MANAGEMENT

BACKGROUND OF THE INVENTION

The present invention relates to a main storage managing method for computer systems and, more particularly, to a virtual storage managing method suited to use in a system in which a program requiring a high response speed and a program requiring a large storage capacity are executed simultaneously.

Hitherto, as one of the most high-grade managing systems in the main storage management of computer systems, a virtual storage called ON-DEMAND PAGE SWAPPING (abbreviation DEMAND PAGING) has been known. An example of such a system is shown in S. E. Mandick & Donovan: Operating Systems, pp 139-165; McGraw Hill Book Company, 1974.

A virtual memory managing system is characterized in that the address of the memory device is not the real address (or physical address) imparted to the physical main storage but is identified by a virtual address attached to a virtual storage region which does not actually exist and is constituted solely of a logical construction. It is, therefore, essential to employ hardware for obtaining the correspondence between the virtual address and the real address as well as a software program for this purpose. The hardware and the software for obtaining this correspondence in combination are usually called in address translation mechanism. The aforementioned DEMAND PAGING is one of the examples of a measure for realizing such an address translation mechanism. The DEMAND PAGING METHOD, therefore, will be outlined hereinbelow.

According to the demand paging method, the virtual storage region is beforehand sectioned into a plurality of small regions of a fixed length referred to as a "Page". On the other hand, the main memory is beforehand divided into small regions of the same length as the page and referred to as Page Frames (abbreviation PF, hereinunder). The pages and PF are provided with Nos. starting from 0 (zero), respectively. The program is so arranged on one or a plurality of consecutive pages in such a manner as not to lap the pages carrying other programs. The following procedure is taken in the DEMAND PAGE METHOD for executing the program. During execution of a program, when it proves that a reference is made to a virtual address in the page which is not correlated to the PF (this will be referred to as "page fault"), an operation is made to obtain correspondence between the page and the PF.

Namely, the aforementioned address translation mechanism operates to establish correpondence between the page and the PF which has not been correlated to the page (such PF will be referred to as "empty" PF). When there is no empty PF, the correspondence between another page and PF is dismissed to make an empty PF and this new empty PF is made to correspond to the aforementioned page.

After the completion of execution of the program, all of the pages employed by the program are dismissed from the correspondence to the PFs so that the PFs become empty.

This DEMAND PAGE METHOD offers the following advantages.

(1) Since only the pages under execution have to be made to correspond to a PF, the size of the program is not limited by the capacity of the main storage. Namely, there is no limit in the size of the virtual storage region theoretically.

(2) There is no tendency that the pages for reference and execution in a predetermined time length are concentrated only in a portion of the program region, so that it seldom occurs that the page which is executed undesirably occupies the PF. In consequence, the efficiency of use of the main storage is considerably high.

(3) For these reasons, when a plurality of programs are executed simultaneously (referred to as "multiprogramming"), the total number of pages employed can be made much smaller as compared with the total number of pages of the program group.

As a consequence, the number of programs which can be contained by the main storage device is much greater than the number which is given by the total page number. This conveniently permits a degree of the multiplication of programs.

On the other hand, however, this method suffers from the following problems.

(1) Since the page fault occurs at a certain frequency during execution of the program, the original program execution time is shortened by the time length for executing the substitution algorithm (this time length will be referred to as the "overhead of the OS"), resulting in a deteriorated processing performance.

(2) Since there is no means for forecasting this reduction in the processing performance in advance, if many programs are executed in a random manner, the undesirable phenomenon called "Thrashing" takes place in which a large part of the working time of the computer is consumed for the overhead of the OS, so that the computer system may materially fail to function.

(3) The price of the computer system is raised by the addition of the address translation mechanism.

Among these three problems, the third one is not so serious because the address translation mechanism can be nowadays produced at a sufficiently low cost thanks to the current development in the technology concerning hardware devices. The first and second problems, however, are fundamental ones and are serious particularly when the real time processing such as in plant control systems is conducted.

SUMMARY OF THE INVENTION

Accordingly, an object of the invention is to provide a virtual memory managing method which permits execution of a program requiring a high response speed, while maintaining the advantage of the DEMAND PAGE METHOD in which a large capacity program is conducted without being limited by the main memory capacity.

To this end, according to the invention, the virtual storage region which is the object of the address translation is divided into at least two parts: namely, an address translation fixed area (referred to as a "FX area", hereinunder) in which the correspondence between the pages and PFs are made at the time of system generation, and an address translation variable region (Floating Area: referred to as a "FL" area, hereinunder) in which the correspondence between pages and PFs is established at the time of start of the program execution and is dismissed when the execution is over. The programs requiring high response speed are disposed in the FX area, while programs of large capacities requiring no high response speed are disposed in the FL area.

The reason why also the FX area is used as the object of the address translation is as follows. The address translation is fixed during the execution of the program. When there is an increase in the capacity due to addition of a function to the program, the changed program is disposed in another virtual storage region. The correspondence between the address and PFs is such that the pages carrying unchanged contents are alloted to the same PFs as previous ones, while the pages carrying changed or modified contents are alloted to the empty FSs. By so doing, it is possible to cope with the demand for the stretching or expansion of the system with the minimum rearrangement in the main storage.

BRIEF DESCRIPTION OF THE DRAWINGS

The above and other objects and features of the invention will be apparent from the following description of the following description in conjunction with the accompanying drawings in which:

FIGS. 9A and 9B are flow charts of MS acquire and release programs.

DETAILED DESCRIPTION OF A PREFERRED EMBODIMENT

Figure 1:
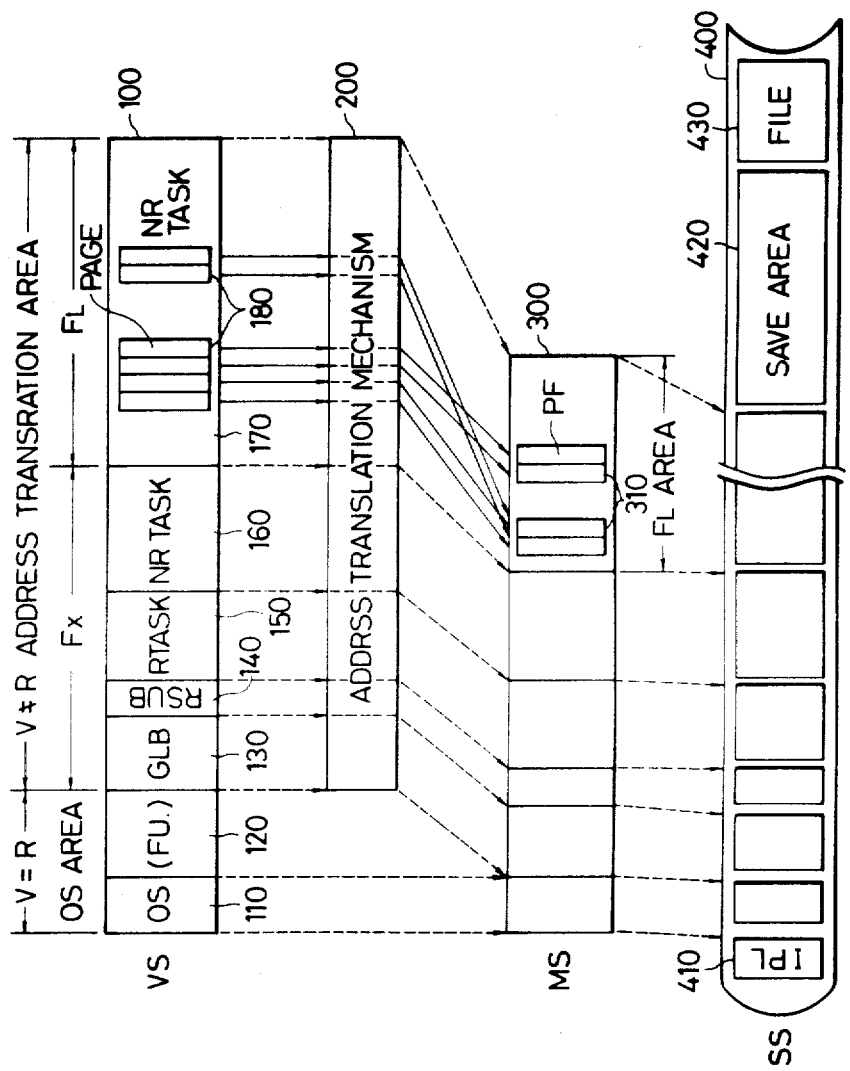
FIG. 1 is an address translation chart for explaining a virtual storage managing system in accordance with the invention.

A preferred embodiment of the invention will be described hereinunder with reference to FIGS. 1 to 4.

The abbreviations used therein and their formal names are listed in the following Table 1.

TABLE 1

| Reference Numerals | Formal names | Abbreviations |
|---|---|---|
| 100 | VIRTUAL STORAGE | VS |
| 110 | OPERATING SYSTEM | OS |
| 120 | FUTURE USE | FU |
| 130 | GLOBAL AREA | GLB |
| 140 | RESIDENT SUBROUTINE | R SUB |
| 150 | RESIDENT TASK | R TASK |
| 160 | NON-RESIDENT TASK | NR TASK |
| 170 | " | " |
| 200 | ADDRESS TRANSLATION MECHANISM | ATM |
| 300 | MAIN STORAGE | MS |
| 310 | PAGE FRAME | PF |
| 400 | SECONDARY STORAGE | SS |
| 410 | INITIAL PROGRAM LOAD | IPL |

FIG. 1 shows the arrangement of a virtual storage (referred to as "VS", hereinunder) 100, main storage (referred to as "MS", hereinunder) 300 and a secondary storage (referred to as "SS", hereinunder) 400 in accordance with the invention, as well as correspondence of parts including address translation mechanism 200. The virtual storage 100 is composed of an address non-translation area (referred to as "V=R area", hereinunder) and an address translation area (referred to as V≠R area, hereinunder). Virtual addresses are alloted for each byte in an upward order starting from address No. 0 alloted to the upper left end in the drawings. The V=R area is composed of an OS (Operating System) area 110 which is a basic software program and an FU (Future Use) area 120 which is used as the extension area of the OS area in the future.

The V≠R area, which is an address translation area, is composed of an FX area in which the correspondence between the page and PF is obtained at the time of system generation and an FL area in which correspondence between the page and the PF is obtained at the time of start of program execution and is dismissed at the time of completion of the program execution.

The FX area is composed of a task RTASK (Resident Task) 150 and a task NRTASK (Non-Resident Task) 160, which are processing programs capable of performing a group of functions in a parallel manner, a global area (GLB) 130 which is a table usable commonly by the tasks, and a sub-routine (RSUB) 140 used commonly by the tasks.

The area of the RTASK 150 is the area in which the pages are shared by the tasks without any overlap, and these tasks are loaded from the SS400 to the MS300 by the IPL410 at the time of start-up.

In contrast, the NRTASK 160 is an area in which a plurality of tasks which are not conducted simultaneously or which need not be conducted simultaneously are made to correspond to the same VS address, thereby to make more efficient use of the VS. The priority for the usage of this area is judged in accordance with the priority levels of these tasks. The judgement is made not at the time of start-up but at the time of execution of the task, and the tasks of inferior priority order are made to shelter into the shelter area 420 of the SS400.

The FL area also is composed of NRtask 170.

In each of the areas OS110, GLB130, RSUB140, RTASK150 and NRTASK160, the MS300 is provided in a 1:1 relation to the VSs. The FL area on the MS300 is smaller than the FL area on the VS.

Real addresses are alloted also for the MS starting with 0 (zero) from the left end in the ascending order for each byte. The V≠R region is divided by the units of the pages 180 and PFs 310. Numbers are alloted also for the pages 180 and PFs 310 in the ascending order starting with 0 (zero) from the left ends of VS and MS. The SS400 is composed of an Initial Program Load (IPL) 410 which is a program adapted to store all regions excepting the FU120 of the VS100 program and to work out the informations of various regions on the MS from the state in which the content of the MS300 is unstable as in the case of turning ON and OFF of the power supply, a region for holding a file of a large capacity which cannot be stored in VS100 and a region for holding the SAVE AREA 420 for NRTASK160. Address numbers are alloted also to the SS400 starting with 0 (zero) from the left end in ascending order for each 512 byte unit. This address will be referred to as a Logical Sector Address (abridged as "LSA", hereinunder).

Thus, the VS100 carries three kinds of tasks having different managing methods, namely, the RTASK150, NRTASK160 and NRTASK170. The RTASK150 of the FX area is used for a high-speed processing task of the most severe real time condition, while the NRTASK170 of the FL area is used for the tasks having sizes exceeding those of RTASK150 and NRTASK160. On the other hand, the NRTASK160 of the FX area is used for the tasks of real time characteristics and capacity intermediate between those of the aforementioned two kinds of tasks. By adopting this share of three kinds of task, it is possible to achieve the object of the invention.

In order to realize the correspondence among the VS100,MS300 and the SS400 explained before in connection with FIG. 1, as well as the method of using the same, it is necessary that the following three points are understood:

(1) detail of the address translation mechanism
(2) specification of task execution by OS110 for determining the correspondence between the pages 180 in the FL area and PF310 in the same.
(3) specification of the VS space managing program for managing the arrangement in VS100, registration or deletion of GLB130,RSUB140,RTASK150 and NRTASK160,170, and for submitting informations necessary for the processing of the above-mentioned items (1) and (2).

A detailed explanation will be made hereinunder as to the items (1) to (3) mentioned above with specific reference to FIGS. 2 to 3.

Figure 2:
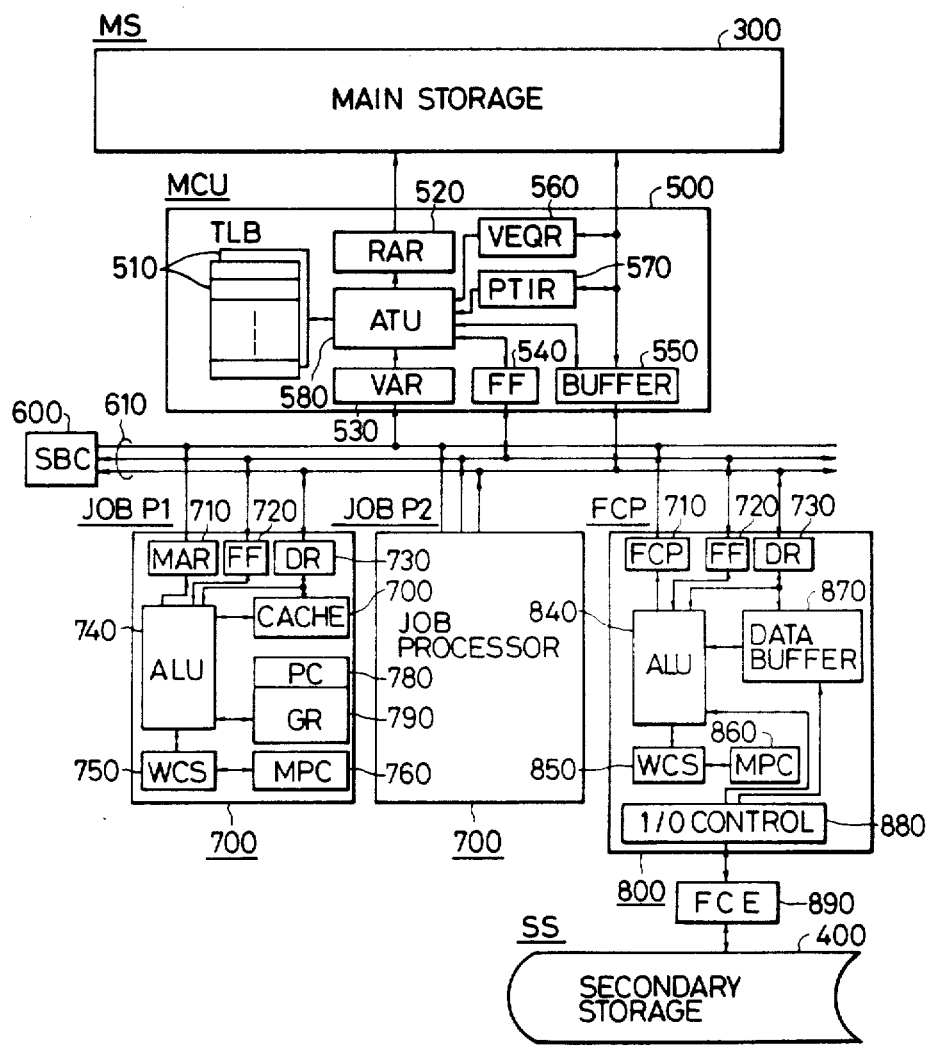
FIG. 2 shows an example of a computer system to which the present invention is applied.

FIG. 2 shows the whole hardware arrangement of a computer system to which the embodiment of the invention pertains.

The abbreviation used therein and their formal names are shown in the following Table 2.

TABLE 2

| Reference Numerals | Formal Names | Abbreviations |
|---|---|---|
| 500 | MEMORY CONTROL UNIT | MCU |
| 510 | TRANSLATION LOOK ASIDE BUFFER | TLB |
| 520 | MAIN STORAGE ADDRESS REGISTER | MAR |
| 530 | VIRTUAL STORAGE ADDRESS REGISTER | VAR |
| 540 | FLIP-FLOPS | FF |
| 550 | BUFFER REGISTER | BUFFER |
| 560 | V=R EREA REGISTER | VEQR |
| 570 | PAGE TABLE INDEX ORIGIN REGISTER | PTIOR |
| 600 | SYSTEM BUS CONTROLLER | SBC |
| 700 | JOB PROCESSOR | JOBP |
| 710 | MEMORY ADDRESS REGISTER | MAR |
| 720 | FLIP-FLOPS | FF |
| 730 | DATA REGISTER | DR |
| 740,840 | ARITHMETIC OPERATION UNIT | ALU |
| 750,850 | WRITABLE CONTROL STORAGE | WCS |
| 760,860 | MICRO PROGRAM COUNTER | MPC |
| 770 | CACHE MEMORY | CACHE |
| 780 | PROGRAM COUNTER | PC |
| 790 | GENERAL REGISTER | GR |
| 800 | FILE CONTROL PROCESSOR | FCP |
| 870 | DATA BUFFER | DB |
| 880 | I/O CONTROLLER | I/O CONTROL |
| 890 | FILE CONTROL ELECTRONICS | FCE |

Generally, the computer system is composed of the aforementioned MS300, a main storage control unit (referred to as "MCU") 500 for controlling the MS, a job processor (referred to as "JOBP", hereinunder) having a function to read and execute the mechanical instruction on the MS, the aforementioned SS400, a file control electronic device (referred to as "FCE", hereinunder) 890 for controlling the SS400, a file control processor (referred to as "FCP", hereinunder) 800 for making a data transfer between the SS400 and MCU500 in accordance with the instructions given by the JOBP700 through the FCE890, a system BUS 610 which interconnects the MCU500,JOBP700 and the FCP800 and provides the data transfer means, and a system BUS controller (referred to as "SBC", hereinunder) 600.

The JOBP700 is composed of a storage address register (referred to as "MAR", hereinunder) 710 for instructing the MCU500 of the VS address as the access object, data register (referred to as "DR", a hereinunder) 730 for storing the data for reading and writing, a group of flip-flops (referred to as "FF", hereinunder) 720 for controlling the MCU500 and FCP800, an arithmetic operation unit (referred to as "ALU", hereinunder) 740 having functions for logical operation, arithmetic operation and shift operation, a program counter (referred to as "PC", hereinunder) 780 for showing the VS address storing the mechanical instruction to be executed next, a group of general registers (referred to as "GR", hereinunder) 790 for use in the operation, a writable control storage (referred to as "WCS", hereinunder) 750 for reading the mechanical instruction and storing what kind of processing should be made, a microprogram counter (referred to as "MPC", hereinunder) 760 for showing the address to be executed next on the WCS750, and a high-speed and small-capacity cache storage (referred to as "CACHE", hereinunder) 770 which, in order to shorten the time of access to the information in MS300, stores the referred information on the MS and is used for the reading of the data on the MS until it is rewritten or additional writing is made due to filling up of the capacity.

The FCP800 has a construction similar to that of JOBP700 and corresponds to each of ALU740, WSC750, MPC760, ALU840, WCS850 and MPC860 but has no PC780 because it has no function for executing the mechanical instructions on the MS300. However, it has a transfer data buffer 870 for absorbing the difference in the data transfer speed between SS400 and MCU500, and an input/output control circuit 880 for controlling the transfer of data between itself and the FCE890 mentioned before.

The MCU500 has an input/output buffer register 550, a VS address register (referred to as "VAR", hereinafter) 530, a real address register (referred to as "RAR", hereinafter) 520, an address translation unit (referred to as "ATU", hereinunder) 580, a translation look-aside buffer (referred to as "TLB", hereinunder) 510, V=R area border register (VEQR) 560, page table index origin register (PTIOR) 570, and a group of flip-flops 540 corresponding to the aforementioned JOBP700 and the FF720 of FCP800.

An explanation will be made hereinunder as to the procedure which is taken when a reference is made to the MS300 as a result of execution of the instruction given by PC780 made under the control of WCS750. Firstly, the JOBP700 sets the VS address to be accessed in the MAR710 and sets information representing that the reference is made in the FF720. As this signal is received by the FF540, the MCU500 takes up the VS address in the VAR530 and then starts up the ATU580. The ATU580 determines the real address by making reference to the VEQR560, PTIOR570 and TLB510, and sets the same in the RAR520 thereby to start the MS300. The ATU580 then picks up the data of address appointed by the RAR520 andsets the same in the input-/output buffer register 550 and, thereafter, informs the FF540 of the fact that the data has been taken out. As the above-mentioned instruction is received by the FF720, the JOBP700 takes the data out of the input-/output buffer register 550 into DR730 thereby to finish a series of operations for making reference to the MS.

Hereinunder, an explanation will be made with specific reference to FIGS. 3 and 4 as to an address translation performed by the ATU580 using the hardware shown in FIG. 2 as the base.

Figure 3:
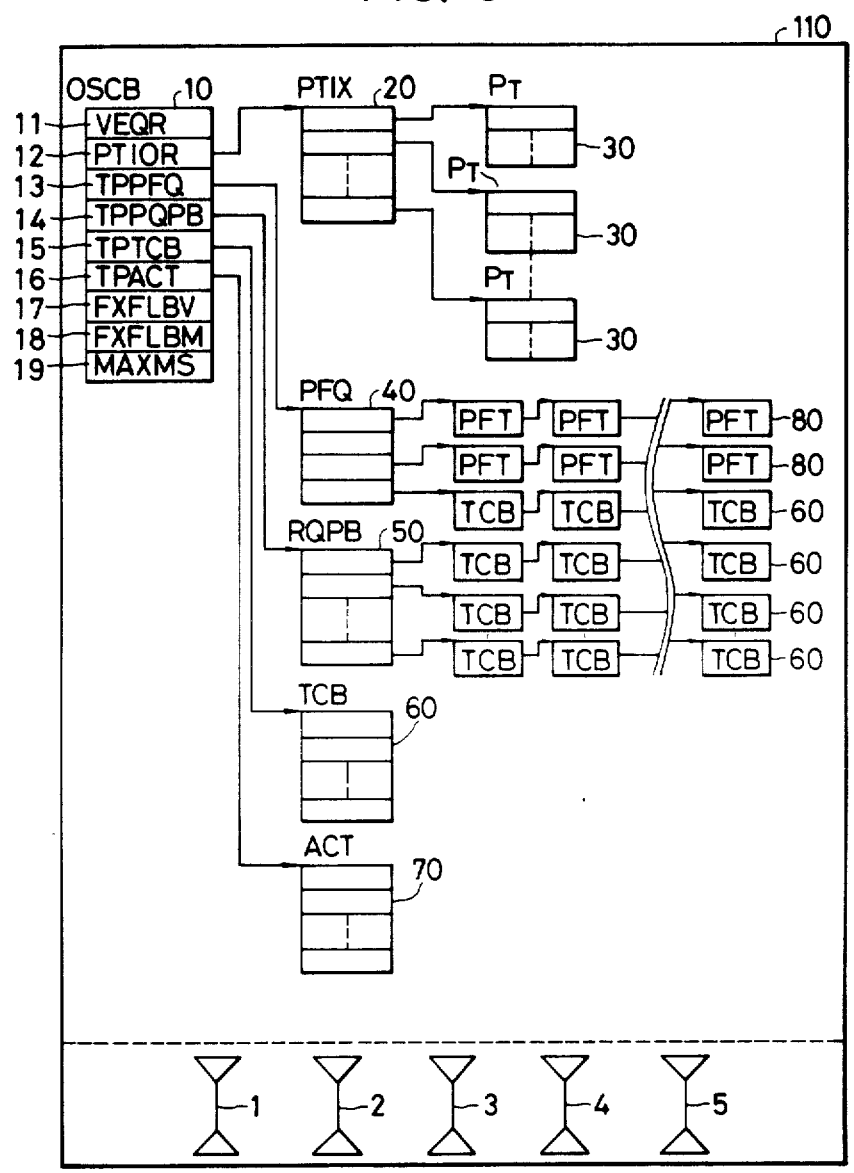
FIG. 3 illustrates examples of an OS table and a program employed by the virtual storage managing system of the invention.

FIG. 3 shows the construction of OS area 110 on the VS100. The abbreviations used therein and their formal names are listed below.

TABLE 3

| Reference Numerals | Formal Names | Abbreviations |
|---|---|---|
| 10 | OPERATING SYSTEM COMMON BLOCK | OSCB |
| 11 | V=R REGISTER | VEQR |
| 12 | PAGE TABLE INDEX ORIGIN REGISTER | PTIOR |
| 13 | TOP ADDRESS OF PFQ | TPPFQ |
| 14 | TOP ADDRESS OF RQPB | TPRQPB |
| 15 | TOP ADDRESS OF TCB | TPTCB |
| 16 | TOP ADDRESS OF ACT | TPACT |
| 17 | FX, FL BOUNDARY ADDRESS OF VS | FXFLBV |
| 18 | FX, FL BOUNDARY ADDRESS OF MS | FXFLMS |
| 19 | MAX SIZE OF MS | MAXMS |
| 20 | PAGE TABLE INDEX | PTIX |
| 30 | PAGE TABLE | PT |
| 40 | PAGE FRAME TABLE | PFQ |
| 50 | READY QUEUE POINTER BLOCK | PQPB |
| 60 | TASK CONTROL BLOCK | TCB |
| 70 | AREA CONTROL TABLE | ACT |
| 80 | PAGE FRAME TABLE | PFT |

Generally, the OS area is composed of a control table and a control program. The control table has a multi-stage type list construction including an OS common block (OSCB) 10 disposed at the uppermost stage, under which are disposed page table index (PTIX) 20, page frame table (PFQ) 40, ready cupointerblock (RQPB) 50, task control block (TCB) 60, and an area control table (PCT) 70. Furthermore, a plurality of page tables (PT) 30 are disposed under the PTIX20, and, under the PFQ40, are disposed page frame table (PFT) 80 of list construction and TCB90. In addition, TCB90 of list construction is disposed under RQPB50. The aforementioned OSCB10 is disposed at a fixed address on the VS100, and is composed of fields such as VEQR(V=R Register) 11 showing the final page address of the V=R region explained in connection with FIG. 1, PTIOR (Page Table Index Origin Register) 12, TPPFQ (Top Address of PFQ) 13, TPRQPB(Top Address of RQPB) 14, TPTCB (Top Address of TCB) 15 and TPACT(Top Address of ACT) which represent the top addresses of PFQ40, RQPB50, TCB60 and ACT70. The OSCB further includes the fields such as FXFLBV (FX,FL Boundary Address of VS) 17 representing the top VS address on the VS100, FXFLBM (FX,FL Boundary Address of MS) 18 which represents the top address of the FL area on the MS300, and MAXMS (Max Size of MS) 19 representing the final real address of the MS.

The control program includes an area registration/deletion program 1 having a function for managing areas on the VS100, a task formation/dismissal program 2 for executing as tasks the RTASK150, NRTASK160,170 out of these areas, a task start/finish program having a function for starting and finishing the tasks formed by the program 2, a task dispatcher (Referred to as "DISP", hereinunder) having a function to select, out of a plurality of tasks to which the start demands are given, the one which is executable and having the highest level of priority and to shift the control to the selected task, and an MS acquire/release program 5 which is called by the DISP4 and, when the task is the NRTASK170, acquires and dismisses the correspondence between the pages 180 and the PFs 310.

Figure 4:
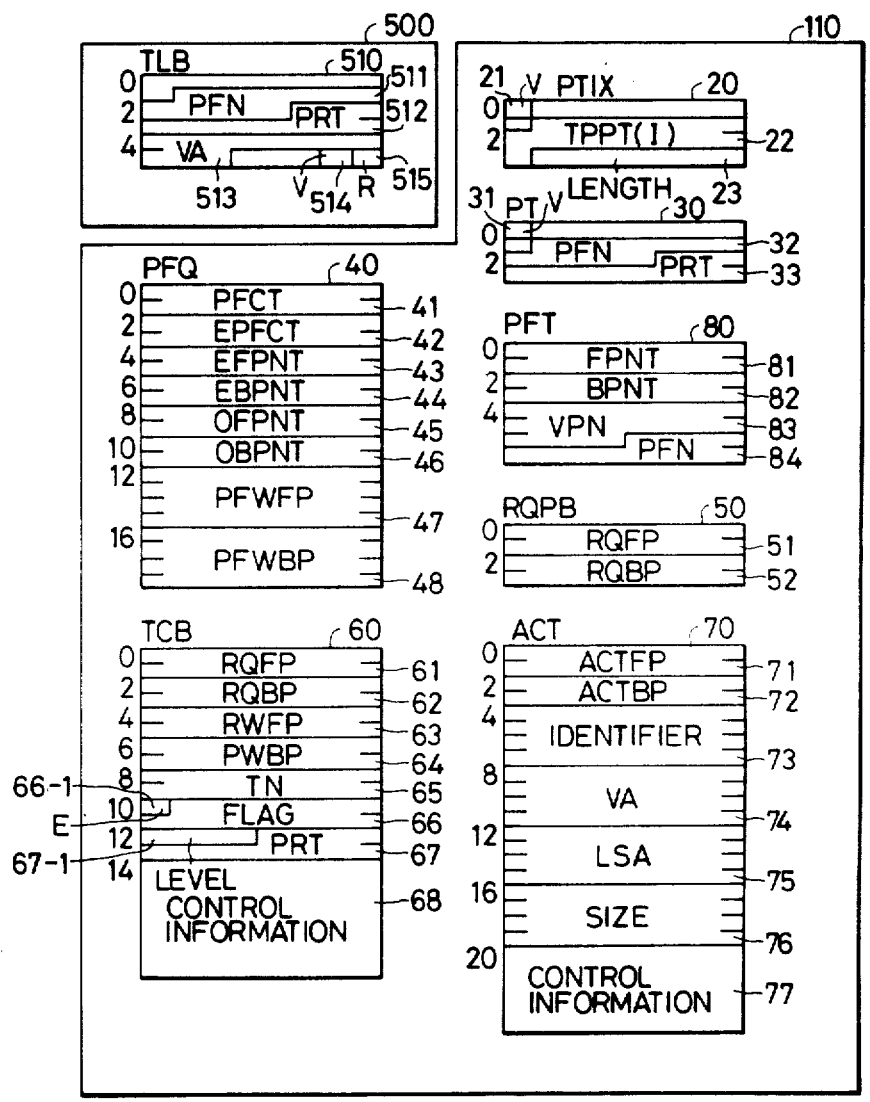
FIG. 4 is an illustration of an example of the control table feed in accordance with the invention.

FIG. 4 shows the construction of the TLB510 in the MCU500, as well as the constructions of the control tables PTIOR12, PTIX20, PT30, PFQ40, PQPB50, TCB60, ACT70 and the PFT80. The abbreviations used therein and their formal names are listed below.

TABLE 4

| Reference Numerals | Formal Names | Abbreviations |
|---|---|---|
| 21 | VALIDITY INDICATION FLAG | V |
| 22 | LEADING VS ADDRESS OF PT 30 | TPPT(I) |
| 23 | LENGTH OF PT 30 | LENGTH |
| 31 | VALIDITY INDICATION FLAG | V |
| 32 | PAGE FRAME NO. | PFN |
| 33 | ACCESS PROTECTION INFORMATION | PRT |
| 41 | TOTAL CASE NUMBER OF PFT | PFCT |
| 42 | NUMBER OF VACANT PAGE FRAME | EPFCT |
| 43 | LEADING VS ADDRESS OF VACANT PFT | EFPNT |
| 44 | FINAL VS ADDRESS OF VACANT PFT | EBPNT |
| 45 | LEADING VS ADDRESS OF OCCUPIED PFT | OFPNT |
| 46 | FINAL VS ADDRESS OF OCCUPIED PFT | OBPNT |
| 47 | LEADING VS ADDRESS OF WAITING TCB | PFWFP |
| 48 | FINAL VS ADDRESS OF WAITING TCB | PEWBP |
| 51,61 | READY QUEUE FORWARD TCB POINTER | R QFP |
| 52,62 | READY QUEUE BACKWARD TCB POINTER | RQBP |
| 63 | RESOURCE WAITING FORWARD TCB POINTER | RWFP |
| 64 | RESOURCE WAITING BACKWARD TCB POINTER | PWBP |
| 65 | TASK NUMBER | IN |
| 66-1 | WAITING STATUS FLAG | E |
| 67 | ACCESS PROTECTION INFORMATION | PRT |
| 67-1 | PRIORITY LEVEL | LEVEL |
| 71 | FORWARD POINTER OF ACT | ACTFP |
| 72 | BACKWARD POINTER OF ACT | ACTBP |
| 73 | MODULE IDENTIFYING INFORMATION | IDENTIFIER |
| 74 | VIRTUAL ADDRESS | VA |
| 75 | LOGICAL SECTOR ADDRESS | LSA |
| 76 | EAREA SIZE | SIZE |

Small numerals attached to the left ends of respective tables show the relative byte positions. In the illustrated embodiment, the VS address has a width of 32 bits (4 bytes) and the page size is 2048 bytes.

The TLB510 has 2 (two) sets of tables of 1024 entries. In each table, 1 entry corresponds to 1 page, and the access is made by detecting the entry No. of the TLB by the virtual page No. (referred to as "VPN", hereinunder) of 11th to 20th bits of the VS address. This is constituted by the page frame No. PFN511, access protection information PRT512 for this page, VA513 corresponding to the first to tenth bits of the VS address (No. as obtained when the VS is sectioned for 1MB), a bit V514 for judging the validity of the TLB and the bit R515 for controlling the rewriting of two sets of TLB.

The PTIOR12 and the PTIX20 have an identical construction, and one entry of PTIX 20 is prepared for 1MB of VS area. This is constituted by a validity indication flag V21, TPPT(I) 22 representing the address of leading VS of the PTIX20 or PT30 and LENGTH 23. The one entry of PT30 is prepared for one page. The PT30 is composed of a validity indication flag 31, page frame No. PFN32 and an access protection information PRT33.

The Page Frame Queue Table PFQ40 is composed of the Page Frame Table (PFT) 80, the total case number PFCT41 of PFT, number EPFCT42 of vacant page frame, VS addresses (EFPNT,EBPNT) 43,44 of leading and final cases of vacant PFT, VS addresses (OFPNT,OBPNT) 45,46 of leading and final cases of occupied PFT and waiting line managing area (PFWFP,PEWBP) 47,48 for holding the task in the waiting state when it is judged that the vacant PFT80 is insufficient in the aforementioned MS acquired program 5. Numerals 47 and 48 denote the addresses of the leading and final cases of the waiting TCB. All of the tables of the list construction are managed by means of the VS addresses of the leading case and the final case as in the present table.

One entry of RQPB 50 is prepared for each preferential level of the task constituted by the waiting line headers 51,52 of the TCB60. The aforementioned task start up program 3 connects the TCB60 of the task to be started to the trailing end of the line waiting for the execution under the control of the managing table which is the RQPB corresponding to the preferential level determined by the task to be started. The task completion program 3 gets rid of the TCB60 from the line waiting for the execution, when the execution of the task is completed.

The TCB60 is composed of pointers RQFP61,RQBP62 prepared for each task and adapted for connection to the RQPB50, resource waiting pointers 63,64 connected in the case of the resource waiting condition for the resources such as PFWFP47,PFWBP48 of PFQ40, task No. 64, waiting flag E66-1, other control flag 66, preferential flag 67-1, access protection information (PRT) 67 and other control informations 68.

The ACT70 is prepared for each module (each RSUB,GLB, task and so forth) in each area on VS100, and is composed of pointers ACTFP71,ACTBP72 for seeking the VS address of the next table, module identifying information IDENTFIER 73, leading VS address VA74 on which the module is disposed, leading SS address LSA75, module size (number of bytes) SIZE76 and other control informations.

The number of the PFT80 prepared corresponds to the number of the PF310 in the FX area on the aforementioned MS300. Each PFT80 is composed of pointers FPNT81,BPNT82 for searching for the VS addresses of the next table, page No. VPN83 and page frame No. PFN84.

An explanation will be made hereinunder as to the method of address translation in the aforementioned MCU500, on the basis of FIGS. 3 and 4.

In the MCU500, first of all, a comparison is made between the VS address given to the VAR530 and the content of the aforementioned V=R register VEQR560. If the VS address is smaller than or equal to the VEQR560, or when the V bit 21 of the aforementioned PTIOR570 shows invalidity, no address translation is made and the ninth to 31st bits of the VAR530 are set as they are. Therefore, since the V=R area on the VS100 is smaller than the address shown by the aforementioned VEQR560, no address translation is made and the address is made to correspond to that in the MS300. If it proved that the VS address is greater than the aforementioned VEQR560 and that the V bit 21 of the PTIOR570 is valid, the entry of the TLB510 is searched out from the 11th to 20th bits of the VAR 530, and a check is made as to whether the first to tenth bits coincide with the VA513 of either one of two sets of the TLB510. When a coincidence is confirmed (referred to as "TLB hit", hereinunder), the PFN511 of the TLB 510 is set in the 9th to 20th bits in the RAR520, and the 31st bits of the VAR are set in the 21st to 31st bits in the RAR 520 thus completing the address translation. If neither of the TLB is coincided through the judgement (referred to as "TLB mis-hit", hereinunder), the process proceeds to the next step. In the next step, first of all, the leading address of PTIX20 is determined from the TPPT(I) 22 of the aforementioned PTIOR570. Then, the LENGTH23 is compared with the first to seventh bits of the VAR 530 and, if the latter is smaller, this condition is judged to be the page fault mentioned before, because it means that there is no PTIX20. If the LENGTH23 is equal to or greater than the content of the first to seventh bits of the VAR530, the address of the case corresponding to the PTIX20 is determined from the first to 11th bits of the VAR530 and the V bit 21 is judged. The state is judged to be page fault if the V bit is judged to be invalid. If valid, the leading address of the PT30 is determined by the TPPT(I) 22. Then, a comparison is made between the 12th to 16th bits of the VAR530 and the LENGTH23 of the PTIX20 to check for the length of PT30 as in the case explained before. Then, the address of the case corresponding to the PT30 is determined from the 12th to 20th bits of the VAR530 and a judgement is made as to whether the V bit 31 is valid. If the V bit 31 proved to be invalid, the state is judged to be a page fault. If valid, the PFN32 is set in the 9th to 20th bits of the RAR520 while the following 21st to 31st bits receive the 21st to 31st bits of the VAR530 thus completing the address translation.

As will be seen from the foregoing explanation, it is possible to fix the address translation and, hence, to realize the aforementioned FX region, by setting beforehand the corresponding page frame No. at the time of the system generation in the PFN32 of the PT30.

FIGS. 5 to 13 in combination show the flow charts of the control programs 1 to 5 shown in FIG. 3.

Figure 5A:
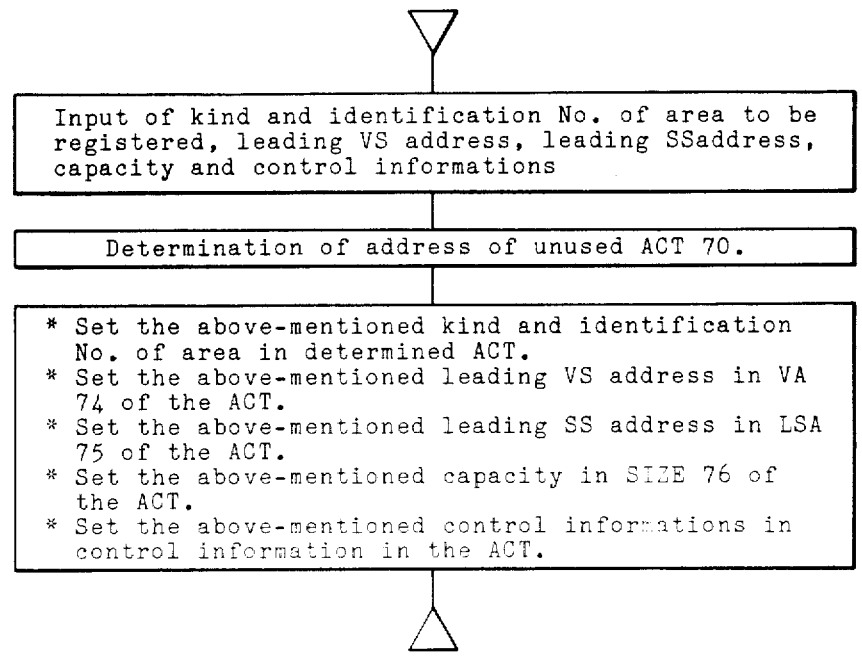
FIGS. 5A and 5B are flow charts of an area registration and deletion program.
Figure 5B:
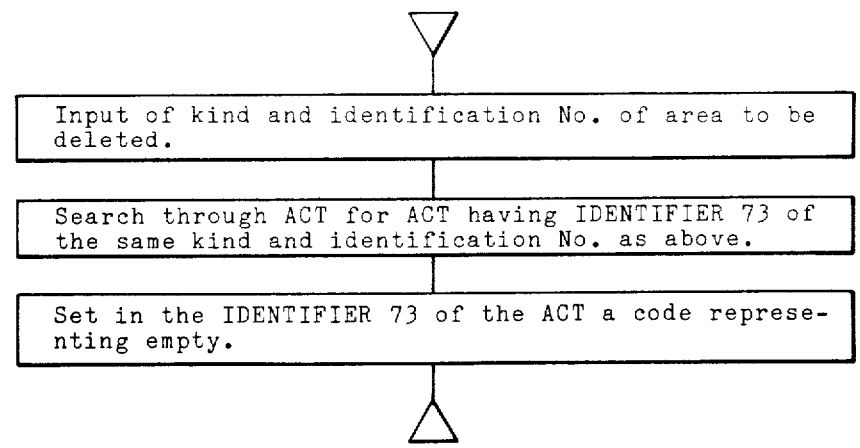

FIGS. 5A and 5B show the flow chart of the area registration and deletion program 1. The area registration program A performs the inputting of the No. for identifying the kind of the area, leading VS address, leading SS address, capacity and control information, and performs an operation (902,903) for setting them in the ACT70.

On the other hand, the area deletion program B performs the inputting (904) of the kind and identification No. of the area, as well as operation (905,906) for making the ACT70 empty.

Figure 6A:
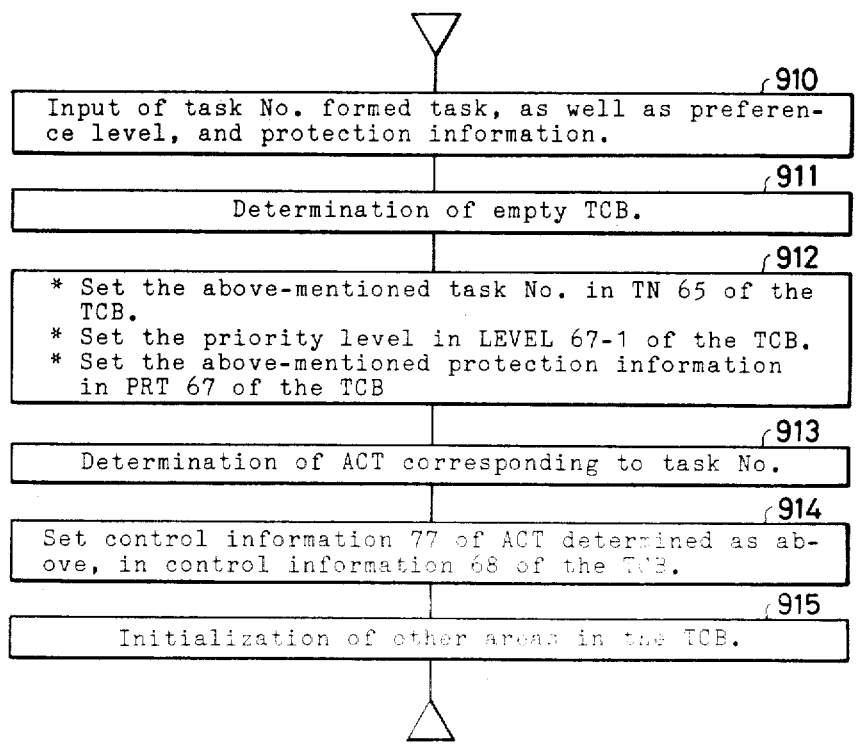
FIGS. 6A and 6B are flow charts of task forming and dismissing programs.
Figure 6B:
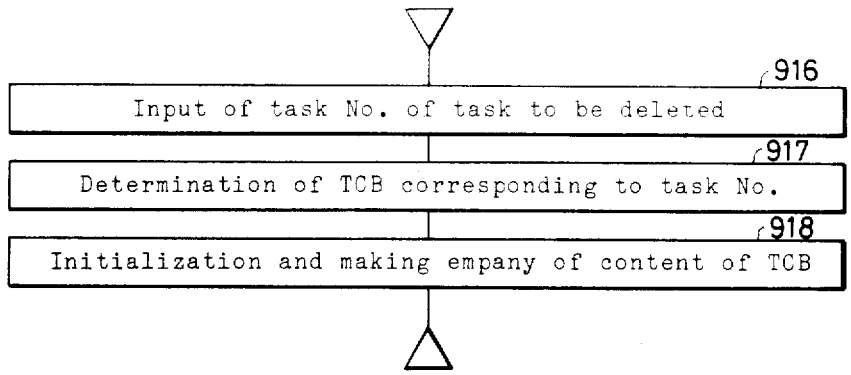

FIGS. 6A and 6B show the flow charts of the task formation/dismissal program 2. The task formation program A performs the inputting (910) of the task No., preference level and protection information, as well as setting (911 to 915) of the same in the TCB60.

The task deletion program B performs the inputting (916) of the task No. and operation (917,918) for making the TCB60 empty.

Figure 7A:
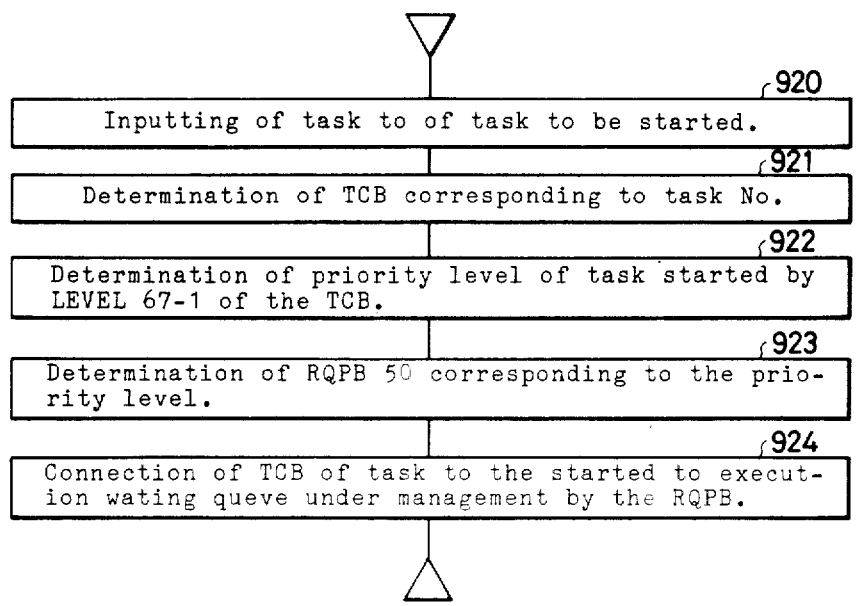
FIGS. 7A and 7B are flow charts of task starting and finishing programs.
Figure 7B:
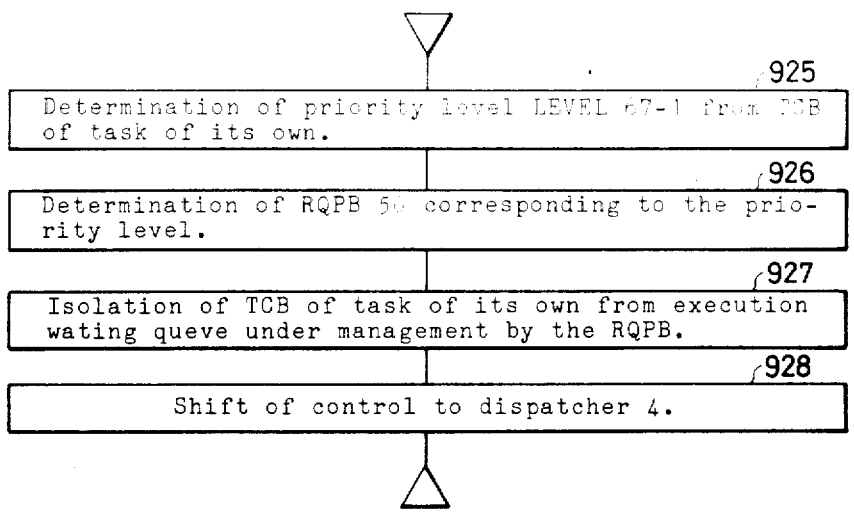

FIGS. 7A to 7B show flow charts of the task starting and finishing program 3. The task starting program A makes the inputting (920) of the task No. and determination of preference level of the corresponding task (921,923). The task starting program A further conducts an operation (923,924) for connecting the TCB60 to the waiting line of the preference level managed by the RQPB50.

On the other hand, the task finishing program B makes operations such as determination (925) of the preference level from the TCB60 of its own, isolation (926,927) of the same from the execution waiting line and shifting (928) of the control to the task dispatcher 4 before the control is changed to another task.

Figure 8:
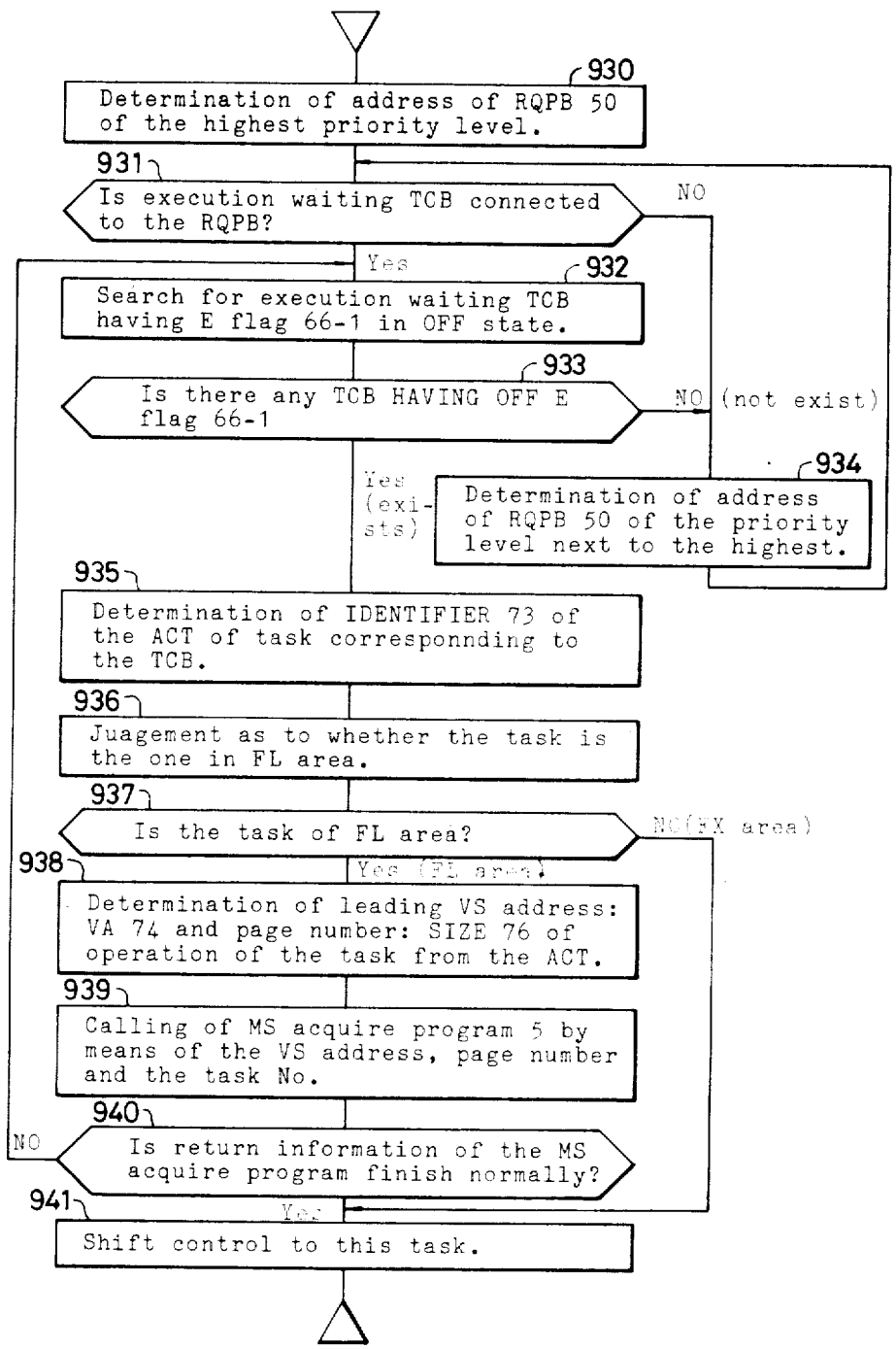
FIG. 8 is a flow chart of a task dispatcher 4.

FIG. 8 shows the flow chart of the task dispatcher 4. This program makes a search (930,931,933,934) for the TCB60 sequentially from the execution waiting line of the RQPB50 of the highest preference level and seeks out (932) the one E flag 66-1 which is OFF. This program then makes judgement (935,936,937) to determine whether this task belongs to the FL area. If so, the program calls for the MS acquired program 5 (937,938) and, if the finish is made in the normal way, conducts an operation (941) for shifting the control to this task.

Figure 9A:
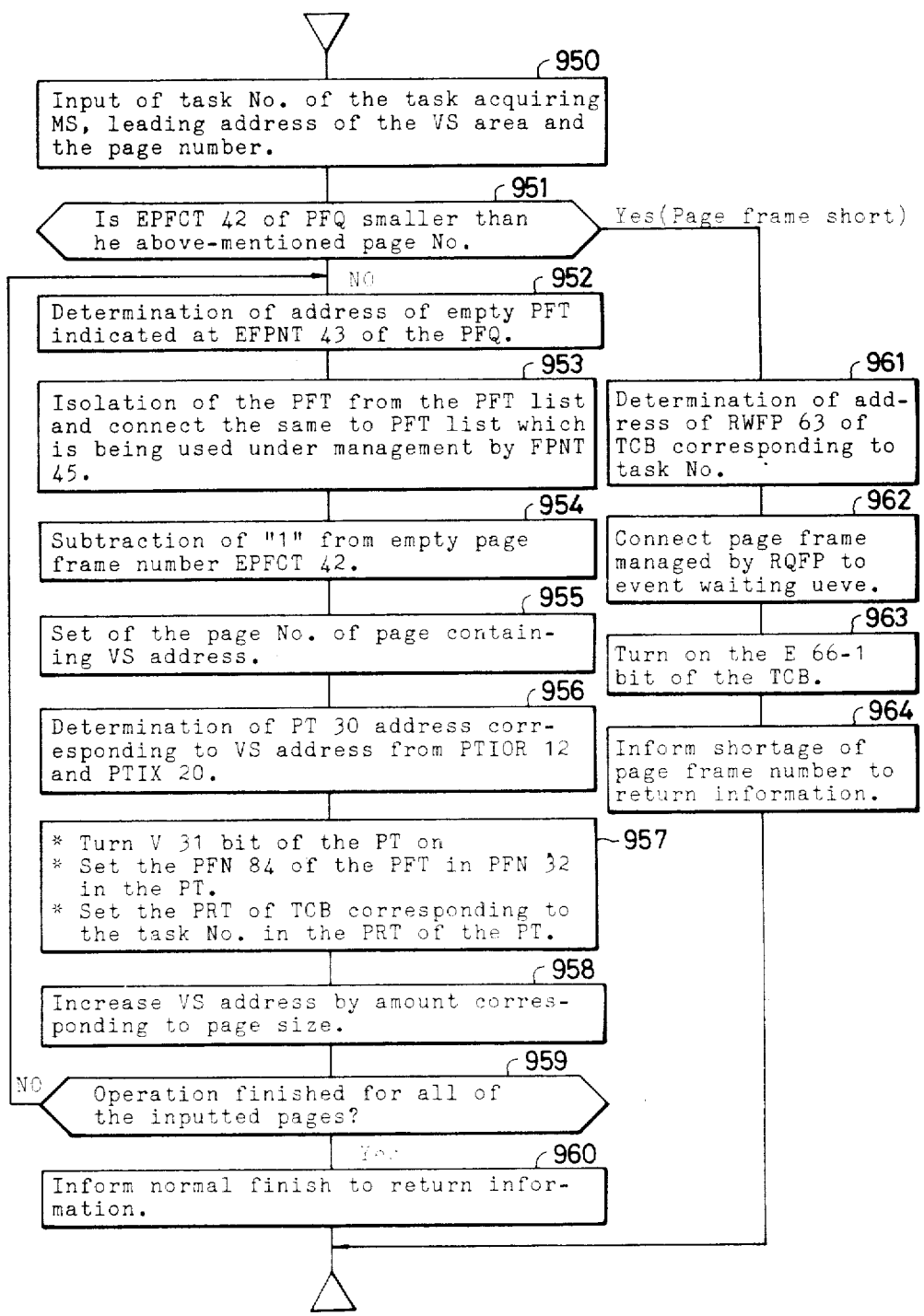

FIGS. 9A and 9B show the flow charts of the MS acquire release program 5. The MS acquire program A makes operations such as inputting (950) of the task No., leading address of the VS area and the page No. and a judgement (951) as to whether there is sufficiently ample empty PFT80. If there is sufficient empty PTF, the program determines the PTF80 and makes the same occupied (952,953) and sets (955) the VPN83 while making operation (956,957) for working out corresponding PT30 for all pages (958,959) to permit a normal finishing. When the above-mentioned judgement by PFQ proved insufficient number of PFT80, the program A holds (961,962,963) in the waiting condition, and performs an operation (964) for reporting shortage of the frame number.

The MS release program B inputs (970) the leading address of the VS area and the page No. and makes an operation (971,972,974,975,976) for making the corresponding PFT80 vacant. The program B then makes a judgement (977) as to whether there is any TCB waiting for empty page frame. If any, it makes an operation (978) for dismissing the tasks from the waiting condition.

An explanation will be made hereinunder as to how the programs 1 to 5 explained hereinbefore operates. For executing a task, the area registration program (FIG. 5A), task formation program (FIG. 6A), and the task starting program (FIG. 7A) are executed in a timed relation in the mentioned order. The timing for execution or the task dispatcher (see FIG. 8) and the MS acquire program (see FIG. 9A) is determined by the OS110 itself.

When it is desired to extinguish a certain task, the task finishing program (FIG. 7B), task deletion program (FIG. 6B) and the area deletion program (FIG. 5B) are executed in a timed relation in the mentioned order. As will be understood from the foregoing description, according to the invention, it is possible to execute a program of a large volume without being restricted by the capacity of the main storage. In addition, it is possible to execute a program which requires a high response speeed. As a consequence, according to the invention, it is possible to obtain flexible adaptability and increased expandability of a computer.

Namely, according to the invention, the address fix area of the address translation area is the area in which the relationship or correspondence between the virtual address and the physical address is fixed. The real time tasks requiring high response speed can be executed by making use of this address fix area. On the other hand, the address variable area is an area which dynamically allots and operates the real space necessary in the start up of the task. The program, which does not necessitate real time operation, can be executed by making use of this area, without being restricted by the address, i.e. without being limited by the capacity of the main storage.

What is claimed is:

1. A method of virtual storage administration in which the storage addresses of a main storage device storing a program and data are managed by a logical virtual address, comprising: dividing the virtual storage area which can be appointed by the virtual address into two parts including an address non-translating area in which address translation from the virtual address into the real address of the main sotrage device is not necessary and an address translation area in which the address translation is necessary; dividing said address translation area into an address fixed area and an address variable area; in said address fixed area, causing the virtual address and the read address in said main storage device to correspoond to each other in a 1:1 fashion at the time of the system generation; in the address variable area, causing correspondence between the virtual address and the read address in said main storage device at the time of commencement of execution of said program; and dismissing the address correspondence in aaid address variable area when the execution of the program is completed.

2. A method of virtual storage management of a program whose capacity is larger than that of a main storage for storing the program and the data of a computer having an address translation mechanism and a virtual storage, comprising:

accessing the main storage by reference to an address non-translating area in which a virtual address is assigned directly to the read address of the main storage;

accessing the virtual storage by reference to an address translating area in which the real address of the main storage is obtained by using said translation mechanism;

dividing the virtual storage area into an address fixed area and an address variable area;

in the address fixed area, allocating the virtual address to the real address in said main storage on the basis of 1:1 correspondence to each other at the time of the computer initiation; and in said address variable area, allocating the virtual address to the real address in said main storage by obtaining the main storage address using said address translation mechanism at the time of commencement of execution of program and dismissing that real address when the execution of the program is completed.

3. A method of virtual storage management according to claim 2 comprising:

storing a boundary register data indicating the boundary between the address fixed area and the address variable area of the virtual storage;

judging from the data stored in said boundary register whether a task belongs to the address fixed area or the address variable area of the virtual storage when a task is formed; and obtaining the real physical address of the main storage corresponding to the virtual address by means of said address translation mechanism when it is judged that said task belongs to said address variable region.

4. A method of virtual storage management according to claim 3, wherein said boundary register is provided as a control table of an operating system in said address non-translating area in said main storage.

5. A method of virtual storage management according to claim 2, comprising:

assigning a task which requires high response speed to said address fixed area; and assigning a task which does not require high response speed to said address variable area.

* * * * *